Figure 1:
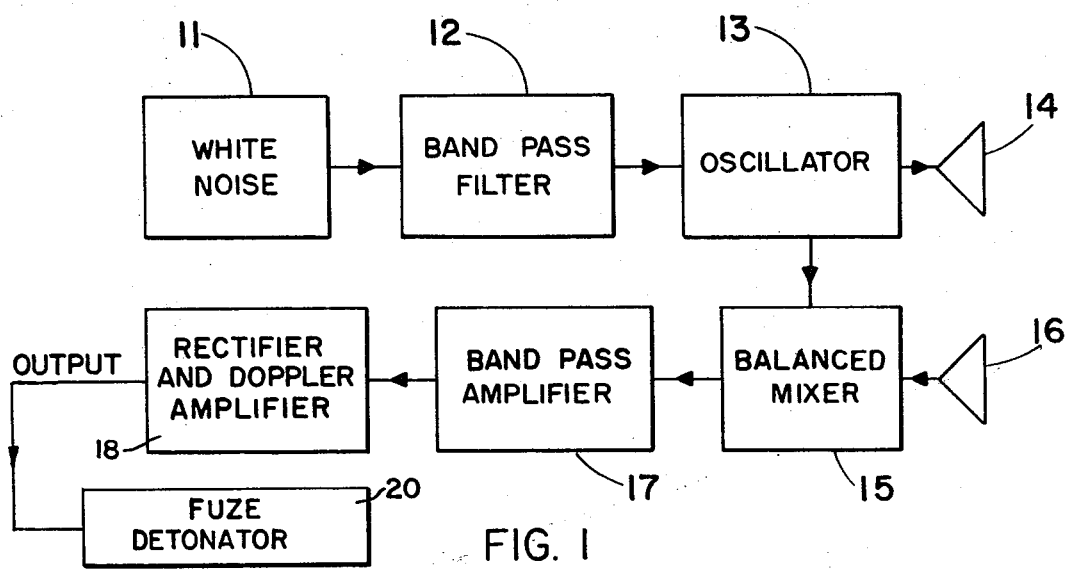

United States Patent

[11] 3,614,782

| [72] | Inventor | Donald J. Adrian<br>Riverside, Calif. |
|---|---|---|
| [21] | Appl. No. | 761,447 |
| [22] | Filed | Sept. 16, 1958 |
| [45] | Patented | Oct. 19, 1971 |
| [73] | Assignee | The United States of America as represented by the Secretary of the Navy |

[54] NOISE-MODULATED FUZE SYSTEM
3 Claims, 2 Drawing Figs.

| [52] | U.S. Cl. | 343/7 PF, 102/70.2 P |
|---|---|---|
| [51] | Int. Cl. | G01s 9/02, F42c 13/04 |
| [50] | Field of Search | 343/7, 14, 13, 100.7, 7 PF; 102/70.2 P; 325/483, 323 |

[56] References Cited
UNITED STATES PATENTS

| 2,842,764 | 7/1958 | Harvey | 343/14 |
| 2,827,627 | 3/1958 | Arams | 343/5 |

FOREIGN PATENTS

| 724,555 | 2/1955 | Great Britain | 343/11 |

*Primary Examiner*—T. H. Tubbesing
*Attorneys*—Q. B. Warner and J. M. St. Amand

ABSTRACT: An FM doppler fuze system comprising means for transmitting a signal having a carrier frequency modulated by a band of random noise, means for mixing the transmitted signal with a return echo signal modified by the doppler effect of the relative movement between the fuze and a target-biased band pass amplifier means coupled to the output of said mixing means for blocking received signals within a predetermined range, and means coupled to the output of said band pass amplifier means responsive to received signals beyond said predetermined range for actuating said fuze.

INVENTOR.
DONALD J. ADRIAN

NOISE-MODULATED FUZE SYSTEM

The invention described herein may be manufactured and used by or for the Government of the United States of America for governmental purposes without the payment of any royalties thereon or therefor.

This invention relates to a fuze system and more particularly to an FM cross-sideband correlation fuze system using white noise and including a band pass amplifier set above the doppler band associated with the mixer whereby a rapid unambiguous, i.e., clear or sharp range cutoff is provided and a reduced response results in a "hole" in the range function at very close ranges.

In one type of frequency-modulated doppler fuze system, a sinusoidal frequency modulation has been utilized to give some range attenuation but the cutoff is very poor and ambiguous due to the periodic modulation. In the copending application of Whiteley and Adrian for a Fuze System, Ser. No. 566,318, filed Feb. 17, 1956, a fuze system is disclosed which provides a rapid unambiguous range cutoff by frequency modulating the transmitted carrier frequency by band-limited random noise. The system disclosed by Whiteley and Adrian provides means for mixing a portion of the transmitted signal with the return signal received from the target, the latter being phase modulated by the doppler effect of the movement between the missile and the target, and the output of the mixer is passed through a low-pass filter which transmits the doppler frequency output to trigger the fuze. Because the range curve reaches a maximum at zero range in a system such as the one disclosed in the Whiteley and Adrian application, sensitivity to nearby reflectors, such as vibrating missile surfaces, is high. Such vibrating surfaces reflect the transmitted signal and may generate a doppler signal that will pass through the low-pass filter thereby reducing the range signal to zero, and interfere with the fuzing action. Another disadvantage of such a system is that amplification of the low doppler frequencies might cause significant microphonics that will also interfere with the fuzing action.

The fuze system of the present invention provides the rapid unambiguous range cutoff by frequency modulation as in the above mentioned Whiteley and Adrian application but in addition a reduced response or "hole" at very close range is provided whereby return signals from the missile structure will not interfere with the fuzing system. The present invention further provides amplification of the returned signal outside the microphonic region thus eliminating the other deficiency of the Whiteley and Adrian system noted above.

The present invention comprises a white noise source that provides a substantially uniform frequency band of noise at random frequencies which is passed through a band pass filter and used to frequency modulate the carrier frequency which in turn is transmitted in the direction of the target. A portion of the transmitted signal is mixed with the return signal received from the target, the latter being phase modulated by the doppler effect because of the relative movement between the missile and the target. The output of the balanced mixer provides a signal at or near zero range which is almost a pure doppler wave while at greater ranges this signal becomes more random. Up to this stage in the system the instant invention and the Whitely and Adrian above mentioned system are similar. In the present invention the signal from the balanced mixer is fed to a band pass amplifier set above the low-frequency doppler band so that almost no signal passes through it at close range thus resulting in a hole in the range function. The signal is then rectified and passed through a doppler amplifier which provides amplification of the signal outside the microphonic region which is adequate to actuate the detonation circuit of a fuze.

One object of the invention is to provide a fuze system having a rapid unambiguous range cutoff.

Another object of the invention is to provide a fuzing system which uses random FM carrier correlation for range cutoff and utilizes a mixer and filter to perform this correlation.

A still further object of the present invention is to provide a fuze system which can be utilized in close proximity to a surface such as the ocean without receiving spurious signals from sea return which will trigger the fuze prematurely.

Another object of the invention is to provide a fuzing system having a reduced response of a reflected signal whereby a hole in the range function is provided at very close range.

A still farther object of the invention is to provide a fuzing system wherein the mixed transmitted and returned signals output is amplified outside the microphonic region.

Figure 2:
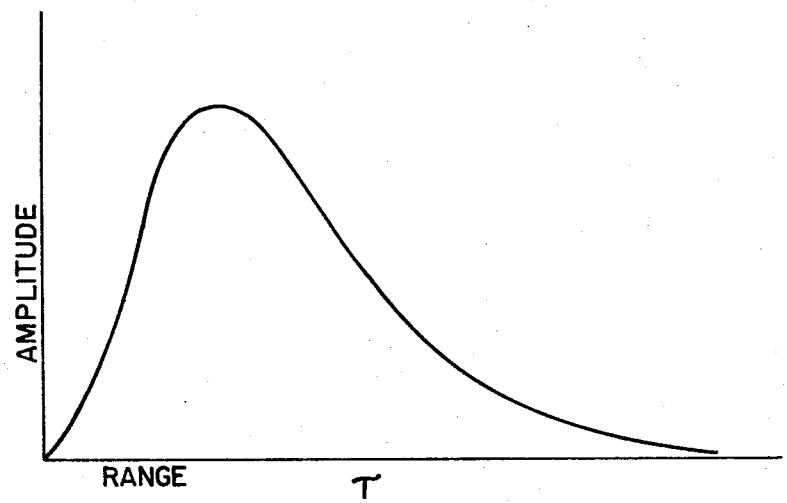

Other objects and many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention; and FIG. 2 is a diagram illustrating the relative amplitude of the response with respect to range of a noise-modulated FM fuze system with a mixer spectrum above the doppler frequency band wherein a range function is shown that peaks at a finite range other than zero.

Referring now to the drawings in detail wherein one preferred embodiment of the present invention is shown in block diagram in FIG. 1. The fuze is assumed to be mounted in a moving missile (not shown) which is guided in a path to approach the target with the RF energy from the fuze being transmitted toward the target and a return echo signal being received therefrom.

A white noise source 11 provides a continuous uniform spectrum of random frequency noise which is passed through a band-pass filter 12. The filter 12 is not critical with respect to the portion of the frequency spectrum passed or the width of the band which is passed.

The band of white noises which is passed through the filter 12 is utilized to modulate the RF carrier frequency in the FM oscillator 13 which transmits the noise-modulated FM signal in the direction of the target through the antenna 14. A portion of the transmitted energy is applied to the balanced mixer 15 where it is combined with the return signal from the target which has been modified by the doppler effect of the relative movement between the missile and target and is received through the antenna 16 and applied to the balanced mixer 15.

The system so far described performs a special type of cross correlation called "cross-sideband correction" and while an exact mathematical expression has not been obtained for the cross-sideband correlation when noise modulation is used, its general properties are known. One of the properties known is at or near zero range the signal out of the mixer is almost a pure doppler wave. Therefore, in the instant invention when the output from the balanced mixer 15 is passed through a band pass amplifier 17 set above the low-frequency doppler band so that almost no signal passes through it at close range, a hole results in the range function as shown in FIG. 2 of the drawings. The signal from the band pass amplifier 17 is then passed through a rectifier and doppler amplifier 18 and the output from the rectifier and doppler amplifier 18 provides a trigger signal when it reaches a suitable level on the relative amplitude curve illustrated in FIG. 2 for firing the detonation circuit 20 of a fuze.

The amplitude curve illustrated in FIG. 2 is actually the envelope of the upper half of the signal received from the band-pass filter 17 which has been rectified and amplified by the rectifier and doppler amplifier 18. Although the band pass amplifier 17 is set above the doppler band where the pure doppler wave would occur due to targets at close range, it is to be understood that all the signals received by the antenna 16, mixed by the balanced mixer 15 and passed through the band pass amplifier 17 have a doppler characteristic because of the relative movement between the missile and target.

In FIG. 2 the curve plotted represents the relative amplitude of the signal from the rectifier and doppler amplifier 18 with respect to range $\tau$. Since the curve is the upper half of the envelope of the signals passed from the band-pass filter 17 to the rectifier and amplifier 18, it can readily be seen that the signals from objects at near zero range have been substantially eliminated thus providing the desired hole to reduce the possibility of actuation of the fuze system by a response from the missile structure. The signals within the envelope represented by the curve in FIG. 2 are the upper half of the return signals from the target which in turn envelope the noise signals mixed therein. The return signals, if plotted, would be in a doppler waveform and would reach the peak amplitude shown in FIG. 2 when the target and missile have reached the desired range to actuate the fuze system.

It is apparent that the system of the instant invention affords distinct advantages not offered in previous systems by providing a reduced response or hole at very close range and in performing amplification outside the microphonic region. Also it is apparent that the system could operate the same with one antenna instead of two as illustrated. The system could be simplified by eliminating the doppler amplifier but the fuze would then have the undesirable characteristic that it could operate against targets that are substantially stationary relative to the missile, such as sea return, since the very low frequency doppler signals would then be passed to the firing circuits. If desired, a fixed delay (not shown) could be inserted between the oscillator 13 and the balanced mixer 15 to make the fuze signal peak at a prescribed range.

Obviously many modifications and variations of the present invention are possible in the light of the above teachings. It is therefore to be understood that within the scope of the appended claims the invention may be practiced otherwise than as specifically described. Cm What is claimed is:

1. An FM doppler fuze system comprising means for transmitting a signal having a carrier frequency-modulated by a band of random noise, means for mixing the transmitted signal with a return echo signal modified by the doppler effect of the relative movement between the fuze and a target-biased band pass amplifier means coupled to the output of said mixing means for blocking received signals within a predetermined range, and means coupled to the output of said band pass amplifier means responsive to received signals beyond said predetermined range for actuating said fuze.

2. A fuze system comprising a white noise source adapted to produce a uniform spectrum of random frequency signals, a band-pass filter connected with said white noise source and adapted to pass a band of said noise, means for modulating a carrier frequency with said band of noise and transmitting a signal in the direction of the target, means for mixing a portion of said transmitted signal and a return signal from a target, amplifying and rectifying means coupled to the output of said mixing means for blocking received signals within a predetermined range, and means coupled to the output of said band pass amplifier means responsive to received signals beyond said predetermined range for actuating said fuze.

3. A fuze system comprising a white noise source adapted to produce a uniform spectrum of random frequency signals, a band-pass filter connected with said white noise source for passing a sharply defined band of noise, oscillating means for modulating and transmitting a carrier frequency with said band of noise and transmitting a signal in the direction of a target means including a balanced mixer for receiving a portion of said transmitted signal and return echo signal from said target-biased band pass amplifier means coupled to the output of said mixing means for blocking received signals within a predetermined range, and means coupled to the output of said band pass amplifier means responsive to received signals beyond said predetermined range for actuating said fuze.